(12) United States Patent
Penuela et al.

(10) Patent No.: US 7,188,767 B2
(45) Date of Patent: Mar. 13, 2007

(54) PHYSICAL CONDITION OR ENVIRONMENTAL THREAT DETECTION APPLIANCE SYSTEM

(75) Inventors: Oswaldo Penuela, Saugus, CA (US); Jonathan Lasch, Santa Clarita, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 0 days.

(21) Appl. No.: 10/785,128

(22) Filed: Feb. 23, 2004

(65) Prior Publication Data

US 2004/0178913 A1    Sep. 16, 2004

Related U.S. Application Data

(63) Continuation-in-part of application No. 10/101,219, filed on Mar. 18, 2002, and a continuation-in-part of application No. 10/101,471, filed on Mar. 18, 2002, now abandoned.

(51) Int. Cl.
    *G06K 7/00* (2006.01)
(52) U.S. Cl. ...................... 235/439; 235/435
(58) Field of Classification Search ............... 235/435, 235/439, 440, 492; 340/573, 539, 309.15, 340/600
    See application file for complete search history.

(56) References Cited

U.S. PATENT DOCUMENTS

| | | | | |
|---|---|---|---|---|
| 4,858,125 A | * | 8/1989 | Washizuka et al. | ......... 600/301 |
| 5,734,625 A | * | 3/1998 | Kondo | ......... 368/10 |
| 5,771,001 A | * | 6/1998 | Cobb | ......... 340/573.1 |
| 5,979,941 A | | 11/1999 | Mosher, Jr. et al. | |
| 6,031,454 A | * | 2/2000 | Lovejoy et al. | ......... 340/539.29 |
| 6,146,591 A | | 11/2000 | Miller | |
| 6,628,201 B2 | * | 9/2003 | Cho et al. | ......... 340/600 |
| 6,703,922 B2 | * | 3/2004 | Shih et al. | ......... 340/309.16 |
| 2002/0156654 A1 | * | 10/2002 | Roe et al. | ......... 705/3 |
| 2004/0017300 A1 | * | 1/2004 | Kotzin et al. | ......... 340/870.11 |

\* cited by examiner

*Primary Examiner*—Thien M. Le
*Assistant Examiner*—April A. Taylor
(74) *Attorney, Agent, or Firm*—Kelly Lowry & Kelley, LLC (57) ABSTRACT

A system includes one or more devices for providing information about a physical condition or environmental hazard. Each device includes a sensor physically associated with the user for detecting a predetermined environmental hazard and/or a physical condition of the user. The device is usually in the form of a wristband patch or tag attached to the user. The one or more sensors are adapted to detect predetermined chemicals, biological organisms, radiation or user blood pressure, heart rate, temperature, oxygen level, glucose level, skin condition, or biological and chemical changes of the user. An electronic circuit communicates with the sensor and includes an alarm for notifying the user or a third party of elevated environmental hazards or abnormal physical conditions of the user. Typically, the electronic circuit includes a transmitter, such as a radio frequency transmitter, for conveying information obtained from the sensor and electronic circuitry to a third party.

77 Claims, 5 Drawing Sheets

PHYSICAL CONDITION OR ENVIRONMENTAL THREAT DETECTION APPLIANCE SYSTEM

RELATED APPLICATION

This application is a continuation-in-part of U.S. application Ser. No. 10/101,219, filed Mar. 18, 2002; and a continuation-in-part of U.S. application Ser. No. 10/101,471, filed Mar. 18, 2002 now abandoned.

BACKGROUND OF THE INVENTION

The present invention generally relates to warning devices. More particularly, the present invention relates to an appliance and integrated system which detects physical condition or environmental threats and alerts a user of the appliance or a third party of the environmental hazard exceeding a predefined limit and/or an abnormal physical condition of the user.

Certain work conditions can be very dangerous. For example, in coal mines methane gas can pose a potential suffocation or explosion threat. In a nuclear facility radiation leaks are a constant concern to the workers and those living nearby. Other industries are also posed with biochemical and chemical hazards. In some instances, very large, elaborate and expensive detection systems are employed to detect such radiation leaks or elevated chemical or biological hazards. An example of such a system is disclosed in U.S. Pat. No. 6,146,591 to Miller. However, these systems are expensive and complicated and due to their size are not mobile, thus limiting their range of detection. In other instances, particularly in fields where radiation is a concern, workers wear badges which increasingly illuminate as the radiation exposure increases. Such badges are typically worn by nuclear reactor facility personnel, radiological and x-ray technicians and the like. However such badges are limited in efficacy as the user must periodically view the tag to determine the amount of radiation to which the worker has been exposed. In the event of a fatal radiation, chemical or biological agent leak, workers at the plant not in the immediate vicinity of such a leak or those living nearby the plant may not be aware of such a leak for quite sometime due to the limitations of the prior art detection systems.

Clean-up crews of environmental hazards are also exposed to such risks. Clean-up crews may wear protective suits and more sophisticated sensors. However, these sensors are limited in many of the same ways as the previously described badges and sensors as well as being cumbersome. Moreover, different individuals may react to different levels of a hazard differently. Such sensors would not take this into account.

Due to chemical, biological, nuclear and radioactive "dirty bomb" weapons, armed forces are increasingly in danger in armed conflicts. Such danger is not necessarily limited to an actual armed conflict, but may also occur at military bases when the armed force personnel are off-duty or sleeping. The cost and lack of mobility of prior art sensing devices has limited their use in such applications. Accordingly, live animals, such as chickens, have been used in some instances to ascertain whether a non-visible nuclear, chemical or biological threat is present.

Increasing terrorism concerns has expanded the risk of such environmental radioactive, biological and chemical hazards. Policemen and airport workers are now in danger. The public at large is also at danger of such biological, chemical and "dirty bomb" attacks. Such substances can be dispersed without a bomb and due to their invisible nature the public may not even know if an attack occurs. For example, in the Gulf War, there was a constant concern in major Israeli cities of such attacks. In the United States since Sep. 11, 2001, the government has periodically sent detection crews into major cities in an effort to determine if such weapons have been unknowingly used.

Accordingly, there is a continuing need for a system for detecting such environment hazards. Preferably, the system would involve sensors which would be mobile and user-specific. In some instances, monitoring the physical condition of an individual as well as the environmental hazard would be desirable. The system should be able to alert not only the individuals within the environmental hazard, but also those outside of the hazard for evacuation purposes and the like. The present invention fulfills these needs and provides other related advantages.

SUMMARY OF THE INVENTION

The present invention resides in a system including one or more devices which provide information about a physical or environmental condition and which provides a warning to the wearer of the device and/or a third party when the condition is present or abnormal. The device generally comprises a sensor which is physically associated with the user for detecting one or more predetermined environmental hazards. Means are associated with the sensor for notifying the user or a third party of the detection of the environmental hazard which has exceeded a predefined limit.

Typically, the device comprises a patch, tag or wristband which is attached to the user. Preferably, the device is removably attached to the user. Each device is assigned and unique identification which can be tracked and associated with each user.

The environmental hazard sensor is adapted to detect predetermined chemicals, biological organisms, or radiation. In a particularly preferred embodiment, the device includes a second sensor adapted to detect physical conditions of the user, such as blood pressure, heart rate, temperature, oxygen level, glucose level and skin condition. This second sensor may also detect biological and chemical changes of the user, such as alterations of blood chemistry, protein, carbohydrate, lipid, or genetic material, or combinations thereof. The sensed alterations may consist of chemical modification of compounds or binding of materials to compounds.

The notifying means comprises an alarm for notifying the user of the detected environmental or physical condition hazard. Such an alarm can comprise a visual or audible alarm. In a particularly preferred embodiment, the alarm is operably connected to an electronic circuit, including data storage means, that communicates with the sensor. Preferably, the electronic circuit of the notifying means is adapted to communicate with the receiver which is not physically associated with the device so as to convey information from the sensor to a third party. Such conveying means may comprise a transmitter, such as a radio frequency transmitter. The transmitter is adapted to convey information obtained from the sensor and the unique identification to a third party. Thus, the user and third party are informed of the presence of an elevated environmental hazard and/or abnormal physical condition of the user of the device. The device may also be used to provide continuous real-time monitoring so as to establish a set of data that will serve as a control set prior to a triggering event.

In use, a device having a unique preassigned identification is attached to each user. Each identification is logged into a database. Once the sensor of the device detects a predetermined hazard, the unique identification and sensor information from the one or more devices is transmitted. The one or more devices detecting the predetermined hazard are then identified and it is then determined if the hazard exceeds a predefined limit. If so, the one or more users of the identified devices are notified of the detection of the hazard exceeding the predefined limit. A similar process is taken when an abnormal physical condition is sensed of one or more of the users.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention resides in a device and system for providing information about a physical or environmental condition, and particularly an environmental hazard. The system of the present invention includes one or more devices which are typically worn by a user and which detect a predetermined environmental hazard present above a predefined limit. Radiation, chemicals, or biological agents can be sensed and detected by the device. As the devices are worn by the individual, they are mobile and can be used in any number of applications, including hazardous workplace environments, in combat areas, at airports, or even by the public at large.

Figure 1:
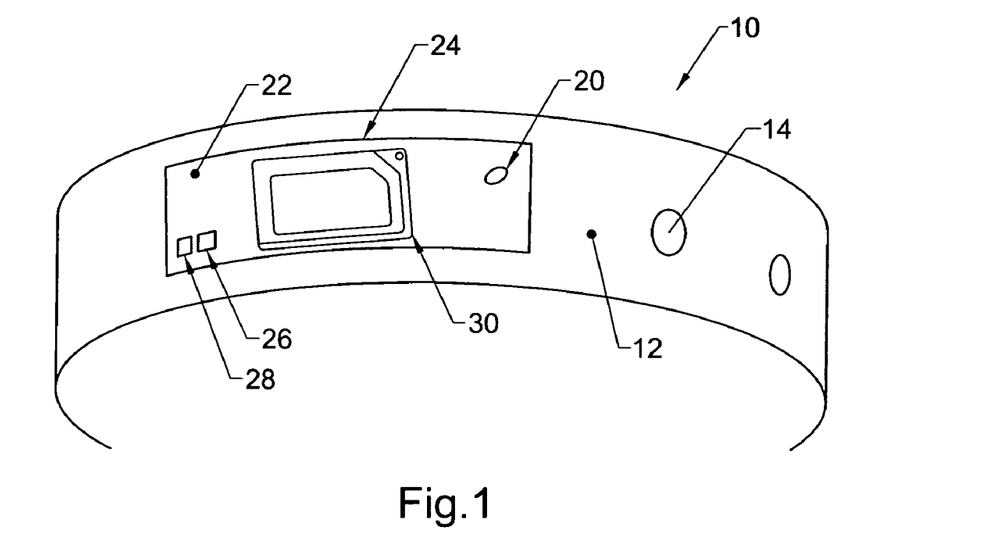
FIG. 1 is a top view of a device in the form of a wristband embodying the present invention.

With reference now to FIG. 1, an exemplary device 10 is illustrated in the form of a wristband or bracelet. The wristband device 10 includes an elongated flexible strip 12 which may be comprised of laminate polymer or paper or plastic or the like. A fastener (not shown) is used to adjustably and securely attach the wristband device 10. Apertures 14 can be used to adjust the length of the strap 12 and may be engagable by the fastener, such as by a buckle or snap or the like. The fastener can also comprise an adhesive wristband closure in accordance with U.S. Pat. No. 5,457,906, a closure mechanism in accordance with U.S. Pat. No. 5,479,797, and rivet, a staple, a crimp or a heat-created bond. It is merely important that the device 10 be securely attached around the wearer's wrist or other body part. As such, the "band" may comprise a wristband, bracelet, patch, headband, armband, leg band, ankle band, finger band, toe band, necklace, waistband or other wearable appliance.

Figure 2:
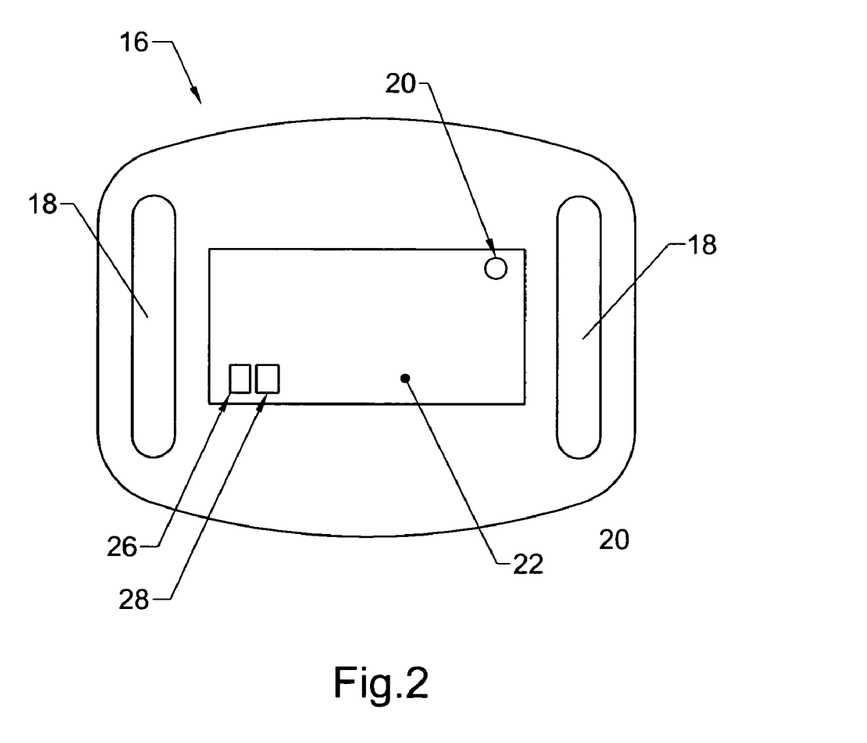
FIG. 2 is a top plan view of a device in the form of a tag attachable to a user or object in accordance with the present invention.

With reference to FIG. 2, a tag device 16 is illustrated which can be attached to an object, such as an article of clothing of the wearer. Such may be attached by adhesive, a fastening pin, or a belt or strap threaded through opposite loops 18 of the tag 16. The base of the tag, similar to the elongated strap 12 may be comprised of any applicable material including paper, organic substrate, plastic, polymeric, etc. The wristband 10 and tag 16 devices may be designed for re-use or be disposable in nature. As necessary, the device 10 or tag 16 may be made water resistant, waterproofed, and/or resistant to certain solvents or chemicals used in the area of this application.

Figure 3:
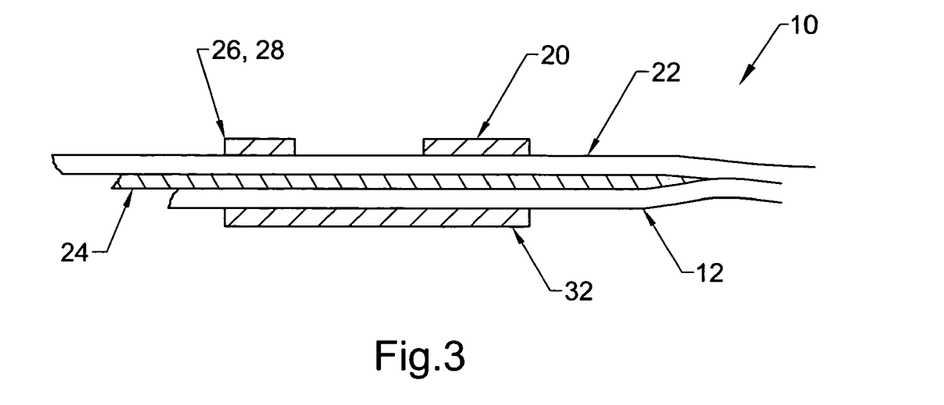
FIG. 3 is a cross-sectional view of the wristband device of FIG. 1.

With reference to FIGS. 1–3, the device 10 and 16 includes a sensor and circuit portion. A sensor 20 is used to detect a predetermined environmental hazard, such as radiation, predetermined hazardous chemicals, or predetermined hazardous biological agents. The sensor 20 may be of any kind of sensor, but typically incorporates an electronic component. The sensor 20 may work in coordination with a sensing substrate 22, such as a substrate which captures and collects microbiological organisms or chemicals for detection by the sensor 20. The sensor 20 preferably uses silicon-based data processing technology or the like but may use non-silicon technology as well. Electronic circuitry 24 is operably connected to the sensor 20 and 22 so as to communicate therewith. The electronic circuitry 24 preferably includes a data storage device, which may be random access memory (RAM), read only memory (ROM), programmable read only memory (PROM), electrically erasable prom (EEPROM), organic PROM, organic RAM, anti-fuse PROM, flash memory, tape, or any other storage retrieval means or any combination of these volatile and non-volatile memory means. The data storage device or chip may further permit reading only, reading and writing, or writing only. The data storage device may store a link or address to information stored in an external database, as will be described more fully herein. Alternatively, the data storage device is capable of storing data to compare against the detected chemical or hazard provided by the sensor 20 to determine if predefined limits have been exceeded. Thus, a microprocessor device or the like may be coupled to the data storage device with an electronic circuitry 24.

The device 10 or 16 also includes an alarm 26 to notify the wearer and user of the device 10 and 16 when an environmental hazardous condition has been detected. Such alarm may be a visual or audible alarm. For example, an LED (light emitting diode) may be used to alert the wearer of the device of the hazard. Other electro-optical components including optical fibers, liquid crystal displays, gas discharge displays and electro mechanical displays may be utilized as well. Alternatively, or in addition to, an audible alarm may be activated such that the wearer need not periodically view the device 10 or 16 to determine that a hazardous condition has been detected. Such an audible alarm can be comprised of a miniature or solid state speaker.

The electronic circuitry 24 preferably also includes other circuits, such as a signal generator circuitry and transmitter 28, antenna circuitry, communication circuitry, and the like for receiving signals from and transmitting signals to a third party. Such can alert the third party to the detection of the environmental hazard, or give periodic updates as to the conditions of the user. Typically, the device 10 or 16 communicates with a third party in a wireless manner. Such wireless communication can include a RFID (radio frequency identification) circuit and transmitter. Alternatively, the wireless communication circuit may incorporate any other features such as Bluetooth compatibility or the like, as more fully discussed in U.S. patent application Ser. No. 10/101,471, filed Mar. 18, 2002, the contents of which are incorporated herein by reference.

The device 10 or 16 may also include an acoustic transducer or the like for audio input or output such that the wearer can communicate with the third party through the receiver/transmitter circuitry. Such devices are known to have algorithms to process speech recognition or output synthesized speech. The acoustic sensor may comprise a piezoelectric transducer that detects acoustic waves. Other types of acoustic sensors may also be used.

As will be more fully described herein, information may be stored electronically in electronic circuit 24, such as in the memory storage device, and communicated to a "reader" or "interrogator". Such communication between the electronic circuitry 24 and by the reader or interrogator is by the transmission reception of the electromagnetic (EM) waves. The use of an RFID system is preferred as the radio frequencies can operate over a wide range of frequencies, including the high-frequency through super-high-frequency radio bands, roughly three Megahertz to six Gigahertz. Such an RFID circuit would comprise antenna circuitry and signal generation circuitry built within electronic circuit 24. Such would communicate with the memory storage device and the control logic or processing unit of the electronic circuitry 24.

The circuitry may be formed by deposition on a layer in the substrate of one or more conductive paths, semi-conductor paths, or polymer materials. The circuit may consist entirely of conductive, insulating and/or semi-conductive materials directly deposited on the substrate to be used. Such may be fabricated of inorganic or organic material, as described in U.S. Pat. No. 5,973,598, the contents of which are incorporated by reference herein. The circuitry may also be printed or printed onto the substrate or embedded within layers of substrate, as disclosed in U.S. application Ser. No. 10/101,219, filed Mar. 18, 2002, the contents of which are incorporated by reference herein.

The electronic circuitry, particularly the communication circuitry, may be active, semi-active, or passive. As such, the circuitry 24 may include a power source in the form of a battery or photovoltaic cell, or may be energized by an external electromagnetic field signal. The battery may be a flexible polymer battery imprinted on or constructed on the appliance substrate, as described in U.S. Pat. No. 5,973,598. Alternatively, the battery may be of a "button" type which is preferably small and thin and which may be replaceable. The battery may be activated when the device 10 or 16 is fastened to its object or by the reception of a signal. Such would conserve battery power until the device 10 or 16 is actually in use. Photovoltaic cells may also provide power and optionally recharge the battery. Such photovoltaic cells and photo diodes are well-known in the art.

With reference now to FIG. 3, in a particularly preferred embodiment, the environmental sensor 20, which senses potential environmental hazards such as radiation, chemicals and biological agents, is disposed externally. In addition, a second sensor 32 is disposed on the underside of the strap or substrate 12 so as to preferably be in contact with the skin of the user and which detects physical conditions of the user, such as heart beat, temperature, skin condition (such as pheromone and sweat production), oxygen level, blood pressure, heart rate, and glucose level and the like. Such sensors 32 may require direct skin contact or may be able to detect the pertinent physical condition using an infrared beam or the like. In some instances, the sensor 32 is capable of being worn on the clothing of the user while still detecting such physical conditions, such as temperature and blood pressure.

With continuing reference to FIGS. 1–3, the device 10 or 16 may be designed so as to be re-usable, disposable, or have a disposable portion and a re-usable portion. For example, the strap or underlying substrate 12 may be disposable whereas the electronic circuitry and sensors are re-usable. U.S. patent application Ser. No. 10/101,219 discloses such partially disposable appliances. That is, the disposable band or base may be unfastened from the non-disposable hub, which contains the sensors and electronic circuitry which may be desired to be re-used.

Figure 4:
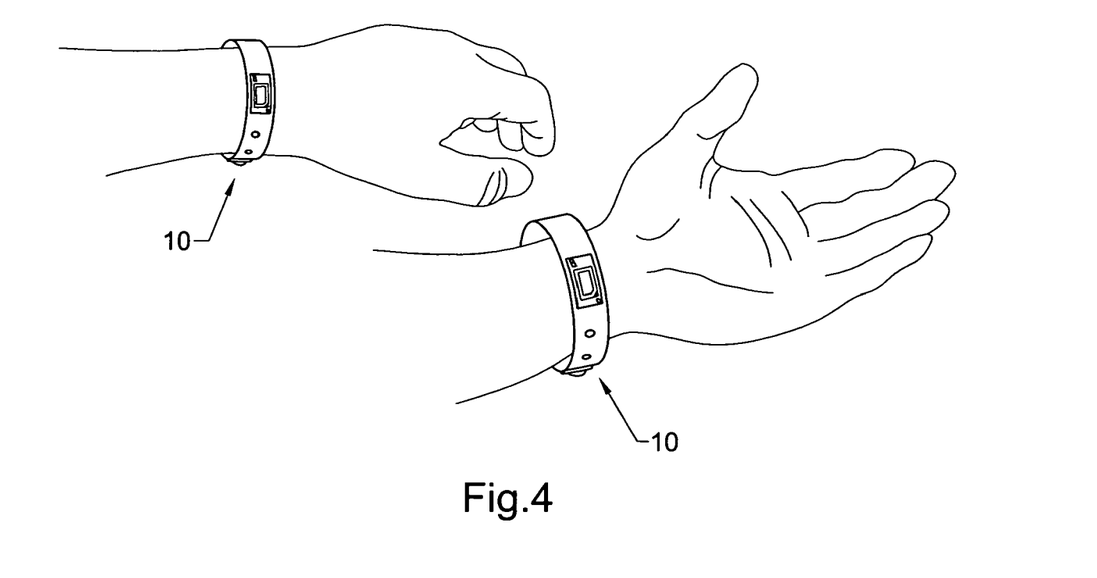
FIG. 4 is a perspective view of the wristband device of the present invention attached to a user's wrist.
Figure 5:
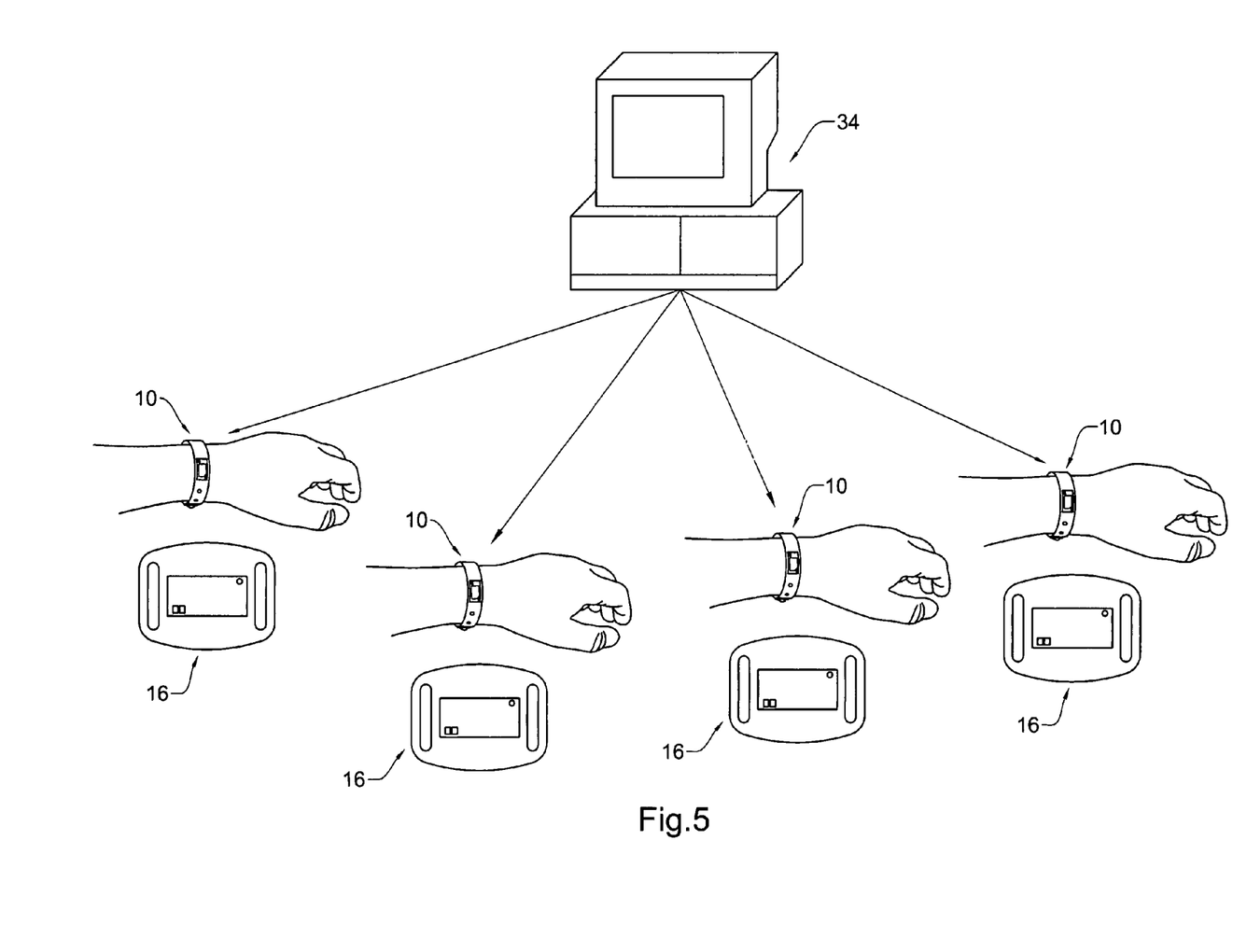
FIG. 5 is a diagrammatic view of multiple sensing devices used in accordance with the present invention in communication with a computer.

With reference now to FIGS. 4 and 5, in use, the device is attached to or worn by the user. In a particularly preferred embodiment, the device 10 comprises a wristband having both the external environmental sensor and the internal physical condition sensor which is in close contact with the user's skin about the wrist or the like. Of course, it will be appreciated by those skilled in the art, that the devices 10 and 16 of the present invention may also be used on inanimate objects as deemed necessary. However, the preferred embodiment is for human use. As illustrated in FIG. 5, the invention is typically used in situations where there are multiple users. In such instance, each device 10 or 16 which is worn by or attached to the user is assigned a unique identification which is stored in a database of a computer 34 or the like.

Figure 6:
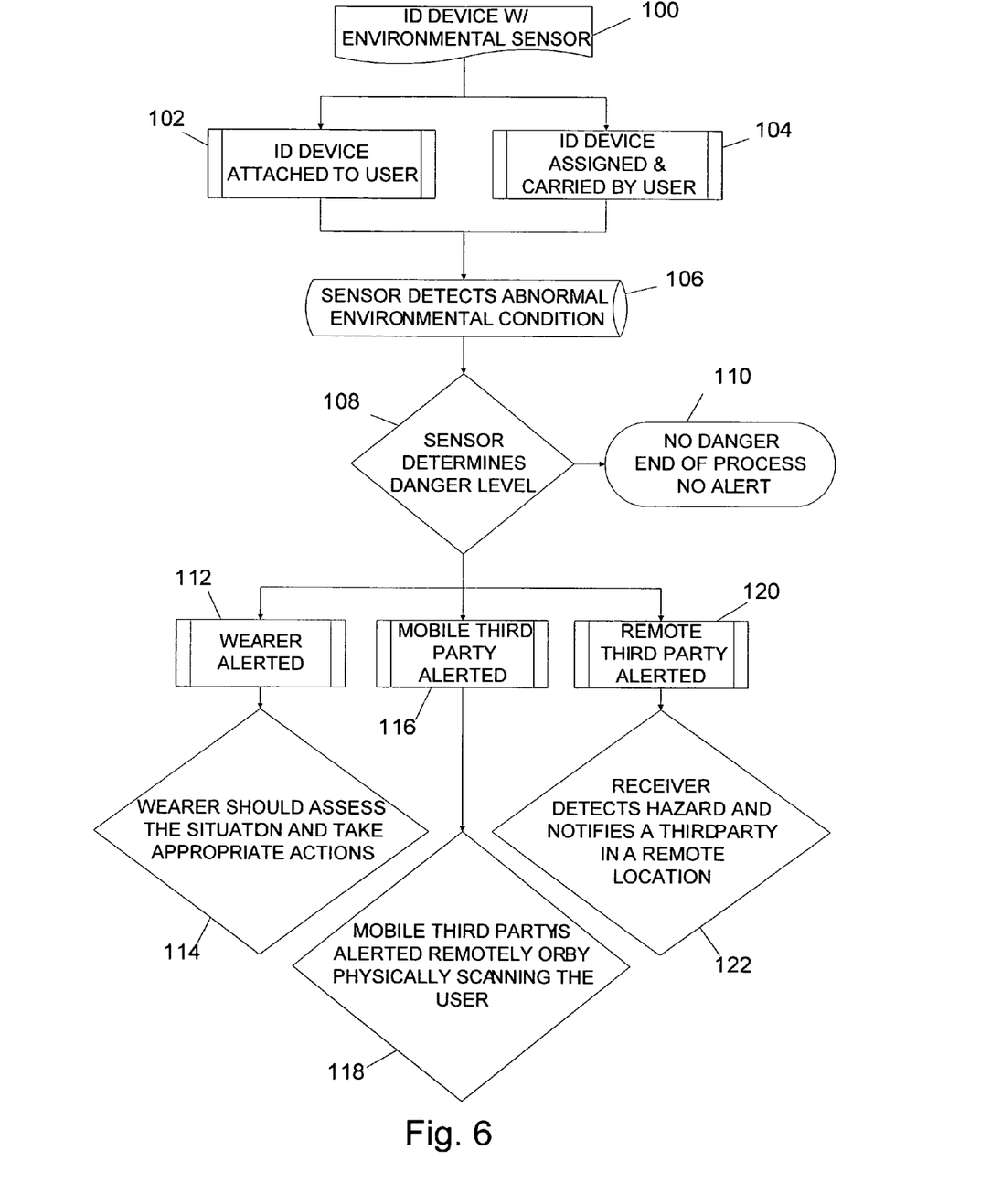
FIG. 6 is a flow chart depicting the steps taken utilizing a device of the present invention having an environmental hazard sensor.

FIG. 6 is a flow chart illustrating the steps taken in accordance with the present invention when the device 10 or 16 has only an environmental sensor. First, a device with the environmental sensor is provided 100. In the event of a single device, the ID device is attached to or otherwise worn and carried by the user 102. However, in the majority of instances a plurality of users are involved, each wearing a device. Thus, the device is assigned an identification and carried by each user 104.

In either event, once the environmental sensor detects an abnormal environmental condition 106, the sensor determines the danger level 108. This determination may be done within the device 10 or 16 itself, or the information may be transmitted to the computer 34 to analyze the data and make such a determination of the danger level. If it is determined that there is no danger 110, such as when the sensor detects a low level or such environmental hazards or provides a false reading, no alert is made.

However, if it is determined that there is a dangerous level of environmental hazard, the wearer is alerted 112, such as with the audio or visual alarm 26 on the device 10 or 16. Upon being notified, the wearer should assess the situation and take appropriate actions 114, such as leaving the area of contamination, swallowing or injecting antidote, or the like.

A mobile third party may also be alerted 116. This mobile third party can be alerted remotely or by physically scanning the user 118. For example, the wearers and users of the devices 10 or 16 may periodically pass through a structure which serves as an interrogator or receiver. Such interrogators/receivers may comprise a hand grip, turn style, doorway or the like, as discussed and disclosed in U.S. application Ser. No. 10/101,219. Alternatively, the communication and transmitting circuitry of the device 10 and 16 may be periodically interrogated remotely or periodically transmit to a local receiver monitored by the mobile third party. For example, in a combat situation, a mobile unit may monitor the environmental conditions of the battlefield with the devices 10 and 16 worn by various soldiers. Another instance would be the monitoring of work personnel in a nuclear power plant. A central receiver could monitor all of the workers remotely, or the workers could be interrogated by a reader as they enter or leave certain areas of the facility.

In some instances, a remote third party is alerted 120. Such may be conducted by the device 10 or 16 transmitting a signal to a remote receiver, or the mobile third party alerting an even more remote third party of the dangerous condition. The receiver will detect the hazard and notify the third party in remote location 122. Using the above examples, the mobile unit on the battlefield could detect a hazard and notify a command center perhaps hundreds of miles away of the hazardous situation. In the case of a nuclear reactor facility, a local government agency or the like could be notified of radioactive contamination within the plant so as to take appropriate measures.

Thus, the communication circuit of the device 10 or 16 may perform a communication function of any type and frequency, such as communicating passively or actively by initiating communications at low or high frequencies. The device 10 or 16 may operate in the low frequency, high frequency, UHF, SHF or microwave radio bands. The identification appliance device 10 or 16 may provide its location to another device or receiver over a small area (e.g. a room or a building) or a large area (e.g. over many miles). Such location information may be provided with a varying degree of accuracy, such as with a less than one meter uncertainty to a greater than one kilometer uncertainty based upon calculation derived from the signals received by the device 10 or 16, such as by using a Global Positioning System or a Local Positioning System, or by using a matrix of receivers responding to the strength or timing of reception of signals received by the device 10 or 16. This would enable the remote third party to determine a geographical area which has been contaminated or attacked. In the workplace environment, the remote third party could determine which room or area of the plant is contaminated to the exclusion of the other areas which would greatly aid in containment and clean up.

Figure 7:
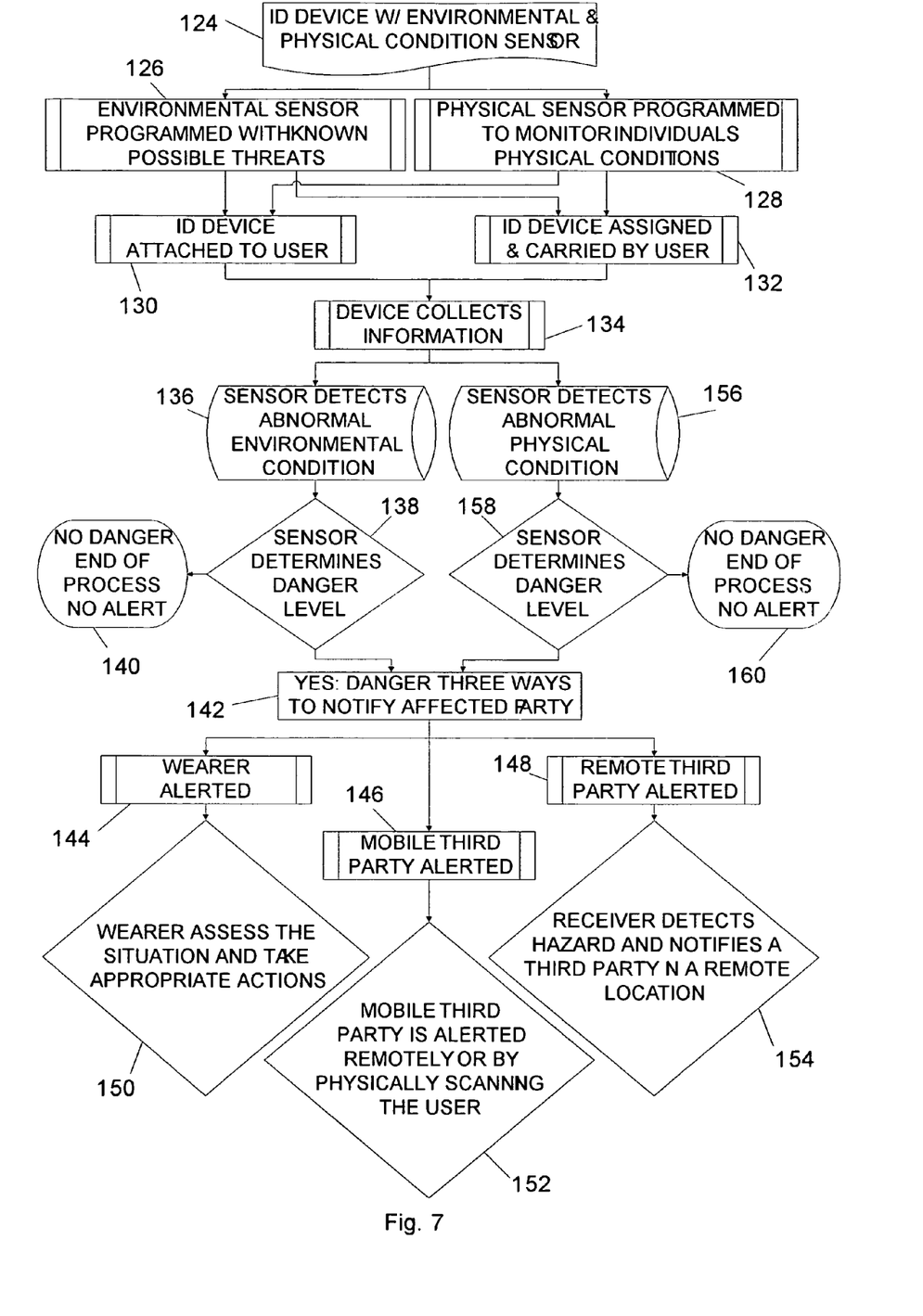
FIG. 7 is a flow chart depicting the steps taken in accordance with the present invention using a device having a sensor for detecting environmental hazards as well as a sensor for detecting abnormal physical conditions of a user of the device.

With reference now to FIG. 7, a flow chart is illustrated depicting the steps taken when a device 10 or 16 incorporates both an environmental hazard sensor as well as a user physical condition sensor. Such a device 10 or 16 is provided 124, the environmental sensor being programmed with known possible threat 126 and the physical sensor being programmed to monitor the individual physical conditions 128. The ID device is assigned an identification when multiple devices are used, and attached to or otherwise carried by the user 130 and 132. Over time the device 10 or 16 collects information 134. If the sensor detects an abnormal environmental condition 136, the sensor determines the danger level 138 and does not alert if there is no danger 140, but does notify the wearer, a mobile third party, or a remote third party in the event of a danger (142–148), as described above. In the case of the wearer, the wearer would assess the situation and take the appropriate action 150. A mobile third party would be alerted remotely or by physically scanning the user 152, as described above. The remote third party may be alerted remotely, such as by a receiver or the like which notifies the third party in a remote location 154. Such may be done by radio transmission, satellite or the like.

If the physical condition sensor detects an abnormal physical condition of the wearer 156, the sensor determines the danger level 158. Such may be done within the device 10 and 16 itself using the microprocessor and storage device. However, in order to keep the device 10 or 16 small and efficient, this information may be transmitted or received by interrogator or receiver reader. For example, the computer system 34 could receive such information either by interrogation of the device 10 or 16 or by periodic reception of a transmission from the device 10 or 16. The computer could then match the device 10 or 16 to the identifying information and code provided in the signal to match the device with the wearer. To account for different physiological conditions of each individual, the database could include various medical history data and the like to make a determination as to whether the individual is in fact experiencing an abnormal physical condition. Pre-set parameters could be defined such as a temperature or heart rate above which virtually any individual would be experiencing an adverse reaction to an environmental hazard not otherwise detected by the environmental hazard sensor 20. For example, if an individual were to be exposed to a dangerous biological or chemical agent and the sensor 20 were to malfunction or not be pre-programmed or designed to detect such hazard, the abnormal physical conditions of the wearer of the device could signal to the mobile third party or remote third party of such a danger. Such a wearer may experience elevated heart beat and blood pressure, elevated temperature, increased perspiration, decreased blood levels, etc. In the event of a danger, steps 142–154 would occur as applicable. However, if no danger was determined, there would be no alert 160 and the device would continue to collect information 134.

It will be appreciated by those skilled in the art that the devices and system of the present invention could be used beneficially in a wide variety of circumstances. The system could be used to protect environmental clean-up crews, miners, nuclear reactor facility personnel, armed forces, and even the public at large which may be subjected to terrorist threats. Contaminated areas could be quickly identified and effected individuals quarantined or receive treatment.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A device for providing information about a physical condition and an environmental condition, comprising:
   a first sensor physically associated with a user for detecting predetermined environmental hazards;
   a second sensor physically associated with a user for detecting physical conditions of the user; and
   means associated with the sensors for notifying the user or a third party of the detection of the environmental hazard or physical condition exceeding a predefined limit.

2. The device of claim 1, wherein the device comprises a wristband.

3. The device of claim 1, wherein the device comprises a tag attached to the user.

4. The device of claim 1, wherein the device comprises a patch attached to the user.

5. The device of claim 1, wherein the first sensor detects at least one of: predetermined chemicals, predetermined biological organisms, and radiation.

6. The device of claim 1, wherein the device is assigned a unique identification.

7. The device of claim 1, wherein the notifying means comprises an alarm for notifying the user of the detected environmental hazard or physical condition.

8. The device of claim 7, wherein the alarm comprises a visual alarm.

9. The device of claim 7, wherein the alarm is operably connected to an electronic circuit that communicates with the sensors.

10. The device of claim 9, wherein the alarm comprises an audible alarm.

11. The device of claim 1, including means for conveying information obtained from the sensors to a third party.

12. The device of claim 11, wherein the conveying means comprises a passive transmitter.

13. The device of claim 12, wherein the transmitter comprises a radio frequency transmitter.

14. The device of claim 12, wherein the device is assigned a unique identification and wherein the transmitter conveys information obtained from the sensors and the unique identification to a third party.

15. The device of claim 1, wherein the physical conditions comprise biological or chemical changes of the user.

16. The device of claim 15, wherein the second sensor detects at least one of: blood pressure, heart rate, temperature, oxygen level, glucose level, skin condition, blood chemistry, protein levels, carbohydrate levels, lipid levels, or genetic material levels or changes of the user.

17. The device of claim 1, wherein the notifying means comprises an audible or visual alarm operably connected to an electronic circuit that communicates with the sensors for notifying the user of the detected physical condition or environmental hazard.

18. The device of claim 1, wherein the device is removably attached to the user.

19. The device of claim 1, wherein the notifying means includes an electronic circuit communicating with a receiver not physically associated with the device.

20. The device of claim 19, wherein the electronic circuitry includes data storage means.

21. A device having a unique identification and for providing information about a physical condition and an environmental condition, the device comprising:
a first sensor physically associated with a user for detecting predetermined environmental hazards;
a second sensor physically associated with a user for detecting a physical condition as a biological or chemical change in the user;
means associated with the sensors for notifying the user or a third party of the detection of the environmental hazard or physical condition exceeding a predefined limit;
means for conveying the unique identification of the device and information obtained from the sensors to the third party.

22. The device of claim 21, wherein the device comprises a wristband, patch or a tag attached to the user.

23. The device of claim 21, wherein the first sensor detects at least one of: predetermined chemicals, predetermined biological organisms, and radiation.

24. The device of claim 21, wherein the notifying means comprises an alarm for notifying the user of the detected environmental hazard or physical condition.

25. The device of claim 24, wherein the alarm comprises a visual alarm or an audible alarm.

26. The device of claim 25, wherein the alarm is operably connected to an electronic circuit that communicates with the sensors.

27. The device of claim 21, wherein the conveying means comprises a passive transmitter.

28. The device of claim 27, wherein the transmitter comprises a radio frequency transmitter.

29. The device of claim 21, wherein the physical condition detected includes at least one of: blood pressure, heart rate, temperature, oxygen level, glucose level, skin condition, blood chemistry alteration, lipid alteration, protein alteration, carbohydrate alteration, and genetic material alteration.

30. The device of claim 21, wherein the notifying means comprises an audible or visual alarm operably connected to an electronic circuit that communicates with the sensors for notifying the user of the detected physical condition or environmental hazard.

31. The device of claim 21, wherein the device is removably attached to the user or an article of clothing of the user.

32. The device of claim 21, wherein the notifying means includes an electronic circuit communicating with a receiver not physically associated with the device.

33. The device of claim 32, wherein the electronic circuitry includes data storage means.

34. A system for providing information about a physical condition and an environmental hazard, comprising:
a device being worn by a user and assigned a unique identification;
a first sensor physically associated with the device for detecting the environmental hazard;
a second sensor physically associated with the device for detecting a physical condition of the user;
a remote receiver communicating with the device;
means for conveying the unique identification of the device and information obtained from the sensors to the remote receiver; and
means associated with the sensors for notifying the user or the remote receiver of the detection of the environmental hazard and/or physical condition exceeding a predefined limit.

35. The system of claim 34, wherein the device comprises a wristband, patch or a tag attached to the user or an article of clothing of the user.

36. The system of claim 34, wherein the first sensor detects at least one of: predetermined chemicals, predetermined biological organisms, and radiation.

37. The system of claim 34, wherein the notifying means comprises a visual or audible alarm for notifying the user or a third party of the detected environmental hazard or physical condition.

38. The system of claim 37, wherein the alarm is operably connected to an electronic circuit that communicates with the sensors.

39. The system of claim 34, wherein the conveying means comprises an electronic circuit including a passive transmitter.

40. The system of claim 39, wherein the transmitter comprises a radio frequency transmitter.

41. The system of claim 34, wherein the second sensor detects biological or chemical changes of the user, including at least one of: blood pressure, heart rate, temperature, oxygen level, glucose level, skin condition of the user, and alterations of blood chemistry, lipids, proteins, carbohydrates or genetic material.

42. The system of claim 41, wherein the notifying means comprises a visual or audible alarm for notifying the user or a third party of the detected environmental hazard or physical condition.

43. The system of claim 42, wherein the alarm is operably connected to an electronic circuit that communicates with the first and second sensors.

44. The system of claim 41, wherein the conveying means comprises an electronic circuit including a passive transmitter in communication with the sensors.

45. The system of claim 44, wherein the transmitter comprises a radio frequency transmitter.

46. A system for providing information about a physical condition and an environmental hazard, comprising:
   a device being worn by a user and assigned a unique identification;
   a first sensor physically associated with the device for detecting the environmental hazard;
   a second sensor physically associated with the device for detecting a physical condition of the user in the form of biological or chemical changes in the user;
   a remote receiver communicating with the device;
   an electronic circuit operably connected to the sensors and having a passive transmitter for conveying the unique identification of the device and information obtained from the sensors to the remote receiver; and
   an alarm for notifying the user or the remote receiver of the detection of an environmental hazard or physical condition exceeding a predefined limit.

47. The system of claim 46, wherein the device comprises a wristband, patch or a tag attached to the user or an article of clothing of the user.

48. The system of claim 46, wherein the first sensor detects at least one of: predetermined chemicals, predetermined biological organisms, and radiation.

49. The system of claim 46, wherein the alarm comprises a visual alarm for notifying the user or a third party of the detected environmental hazard or physical condition.

50. The system of claim 46, wherein the alarm comprises an audible alarm operably connected to the electronic circuit.

51. The system of claim 46, wherein the transmitter comprises a radio frequency transmitter.

52. The system of claim 46, wherein the biological or chemical changes in the user include at least one of: blood pressure, heart rate, temperature, oxygen level, glucose level, skin condition of the user, and alterations of blood chemistry, protein, carbohydrate, lipid, or genetic material.

53. The system of claim 52, wherein the conveying means comprises an electronic circuit including a passive transmitter in communication with the second sensor.

54. The system of claim 53, wherein the transmitter comprises a radio frequency transmitter.

55. The system of claim 52, wherein the notifying means comprises a visual or audible alarm for notifying the user or a third party of the detected environmental hazard or physical condition.

56. The system of claim 55, wherein the alarm is operably connected to an electronic circuit that communicates with the first and second sensors.

57. A method for monitoring physical and environmental conditions of users in a potentially hazardous environment, comprising the steps of:
   assigning each user a device having a unique identification, a first sensor for detecting environmental conditions around the user, and a second sensor for detecting physical conditions of the user;
   logging each identification into a database;
   detecting a predetermined hazard using either the first or second sensor of one or more of the devices;
   conveying the unique identification and sensor information from the one or more devices to a receiver;
   identifying the one or more devices detecting the predetermined hazard; and
   notifying the one or more users of the identified devices of the detection of the predetermined hazard.

58. The method of claim 57, including the step of determining if the detected hazard exceeds a predefined limit.

59. The method of claim 57, including the step of attaching a device to each user.

60. The method of claim 59, wherein the device comprises a wristband, patch or tag attachable to the user or an article of clothing of the user.

61. The method of claim 57, wherein the detecting step comprises the step of detecting an environmental hazard.

62. The method of claim 61, wherein the sensor detects at least one of: predetermined chemicals, predetermined biological organisms, and radiation.

63. The method of claim 57, wherein the detecting step comprises the step of detecting a user physical condition hazard.

64. The method of claim 63, wherein the detecting step comprises the step of detecting at least one of: blood pressure, heart rate, temperature, oxygen level, glucose level, skin condition, and alterations of blood chemistry, carbohydrates, lipids, proteins, or genetic material of each user.

65. The method of claim 57, wherein the conveying step includes the step of passively transmitting the unique identification and sensor information from the one or more devices to the receiver.

66. The method of claim 65, including the step of using a radio frequency transmitter to transmit the unique identification and sensor information from the one or more devices to the receiver.

67. The method of claim 57, wherein the notifying step includes the step of activating an alarm to notify the one or more users of the detection of the hazard exceeding a predefined limit.

68. The method of claim 67, including the step of continuously monitoring the user in real time to create control data prior to detecting an abnormal physical condition.

69. A method for monitoring physical and environmental conditions of users in a potentially hazardous environment, comprising the steps of:
   attaching a device to each user, the device having a unique pre-assigned identification, a first sensor for detecting environmental conditions around the user, and a second sensor for detecting physical conditions of the user;
   logging each identification into a database;
   detecting a predetermined hazard using either the first or second sensor of one or more of the devices;
   transmitting the unique identification and sensor information from the one or more devices to a receiver;
   identifying the one or more devices detecting the predetermined hazard;
   determining if the detected predetermined hazard exceeds a predefined limit;
   notifying the one or more users of the identified devices of the detection of the predetermined hazard exceeding the predefined limit.

70. The method of claim 69, wherein the device comprises a wristband, patch or tag attachable to the user or an article of clothing of the user.

71. The method of claim 69, wherein the detecting step comprises the step of detecting an environmental hazard.

72. The method of claim 71, wherein the sensor detects at least one of: predetermined chemicals, predetermined biological organisms, and radiation.

73. The method of claim 69, wherein the detecting step comprises the step of detecting a user physical condition hazard.

74. The method of claim 73, wherein the detecting step comprises the step of detecting the alteration of at least one of: blood pressure, heart rate, temperature, oxygen level, glucose level, skin condition, lipid levels, protein levels, carbohydrate levels, and genetic material of each user.

75. The method of claim 69, including the step of using a radio frequency transmitter to transmit the unique identification and sensor information from the one or more devices to the receiver.

76. The method of claim 69, wherein the notifying step includes the step of activating an alarm to notify the one or more users of the detection of the hazard exceeding the predefined limit.

77. The method of claim 76, including the step of continuously monitoring the user in real time to create control data prior to detecting an abnormal physical condition.

* * * * *